(No Model.)
W. J. OSTERMAN.
SPOON.
No. 510,286. Patented Dec. 5, 1893.
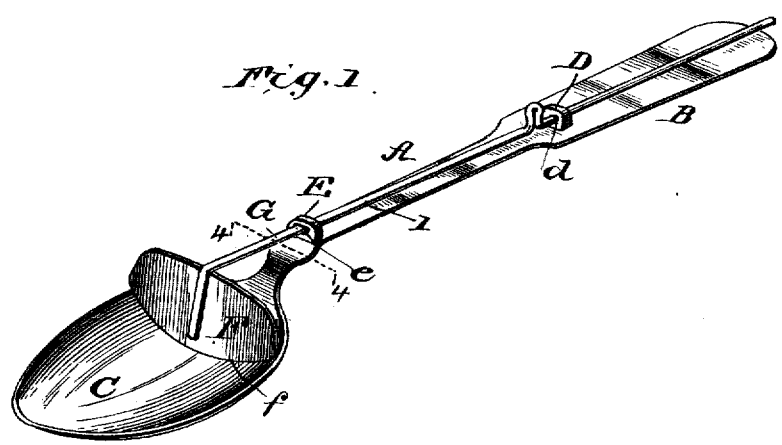
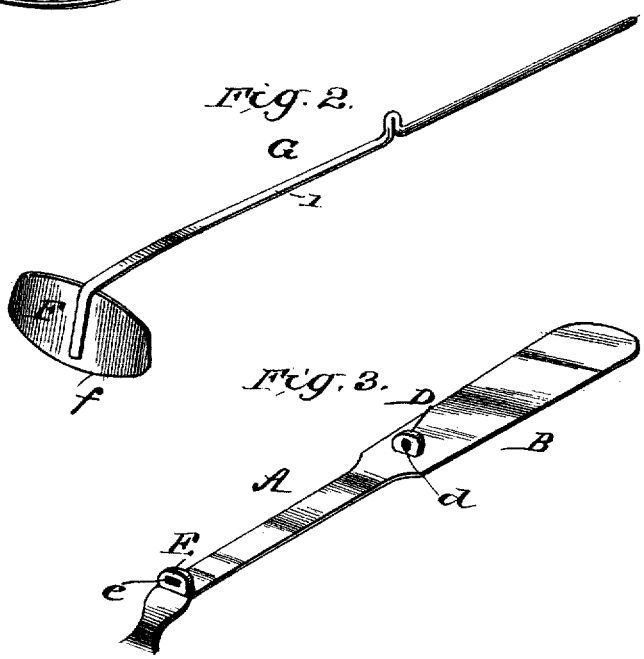
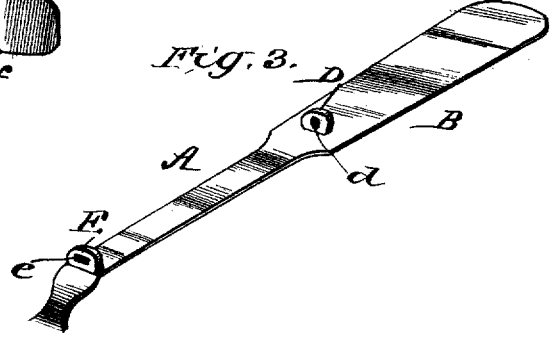
WITNESSES:
Jos. A. Ryan
P. B. Turpin
INVENTOR
William J. Osterman
BY Munn & Co
ATTORNEYS.

United States Patent Office.

WILLIAM J. OSTERMAN, OF RICHMOND, VIRGINIA, ASSIGNOR OF ONE-HALF TO SUSIE A. NEWELL, OF SAME PLACE.

SPOON.

SPECIFICATION forming part of Letters Patent No. 510,286, dated December 5, 1893.

Application filed July 20, 1893. Serial No. 481,017. (No model.)

*To all whom it may concern:*

Be it known that I, WILLIAM J. OSTERMAN, of Richmond, in the county of Henrico and State of Virginia, have invented a new and useful Improvement in Spoons, of which the following is a specification.

My invention is an improvement in spoons and particularly in scraping devices by which to clean the spoon of any sticky material such as creamed potatoes, which may be dipped up thereby and the invention has for an object to provide a simple construction which may be conveniently applied to any ordinary spoon, will present no great difficulty in cleaning, will press the scraper proper firmly to the spoon throughout its stroke, operate to retain the scraper in any adjustment to which it may be set along the spoon bowl, and will also tend to prevent lateral play of the scraper.

The invention consists in the special constructions and combinations of parts as will be hereinafter described and pointed out in the claim.

In the drawings—Figure 1 is a perspective view of a spoon provided with my improvements. Fig. 2 is a detail view of the scraper and its shank. Fig. 3 is a detail view of the spoon handle and Fig. 4 is a detail section on about line 4—4 Fig. 1.

The spoon A may have its handle B and bowl C of ordinary form and construction. On the upper side of the handle I provide upper and lower guides D and E having openings *d* and *e* for the shank of the scraper. The opening *e* in the guide E is made in slot form and is elongated laterally or in a direction parallel to the plane of the spoon handle for the purpose described hereinafter.

The scraper F has its lower edge *f* conformed to the curvature of the spoon bowl and has its shank G fixed rigidly to it. This shank slides in the guides D and E and has between said guides a handle projection *g* which serves as a stop to limit the movement of the scraper shank and also as a handle in sliding the shank. The portion 1 of the shank between the projection *g* and the scraper is flattened transversely and fits the opening *e* in the guide E so that it may slide longitudinally in said opening. The end of the portion 1 of the shank next to the scraper proper is normally depressed so that when the scraper is applied thereto and the parts are adjusted in place on a spoon the scraper will be given a tension against the spoon bowl causing it to hug said bowl closely as it is moved therealong. The flattening of the shank portion 1 transversely operates advantageously in producing this tension and also in preventing any lateral play of the scraper as the fitting of the said portion 1 in the opening *e* tends to prevent the turning of the scraper shank. This tension of the scraper against the spoon bowl is further desirable as it permits the scraper to be retained in any adjustment along the bowl so that it may be set to measure powdered, or semi-fluid substances.

In use the spoon may be used with one hand the thumb engaging the handle projection of the scraper shank and operating the scraper back and forth.

Having thus described my invention, what I claim as new, and desire to secure by Letters Patent, is—

The improved spoon herein described provided upon the upper side of its handle with upper and lower guides the opening *e* of the lower guide being elongated laterally in a line parallel with the plane of the spoon handle, the scraper conformed at its lower edge to the spoon bowl, and the scraper shank held in said upper and lower guides, provided between the same with a handle projection and having its portion 1 between said handle portion and the scraper proper flattened transversely and fitted in the elongated opening *e* of the lower guide all constructed and adapted for use substantially as and for the purposes set forth.

WILLIAM J. OSTERMAN.

Witnesses:
FRANK. D. MILLER,
WILLIAM WEBB SYDNOR.